US009258620B2

(12) United States Patent
Chen et al.

(10) Patent No.: US 9,258,620 B2
(45) Date of Patent: *Feb. 9, 2016

(54) METHOD AND SYSTEM FOR CONTROLLING DATA DISTRIBUTION VIA CELLULAR COMMUNICATIONS UTILIZING AN INTEGRATED FEMTOCELL AND SET-TOP-BOX DEVICE

(71) Applicant: Broadcom Corporation, Irvine, CA (US)

(72) Inventors: Xuemin (Sherman) Chen, San Diego, CA (US); Charles Abraham, Los Gatos, CA (US); Wael William Diab, San Francisco, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 13/731,544

(22) Filed: Dec. 31, 2012

(65) Prior Publication Data

US 2013/0125163 A1 May 16, 2013

Related U.S. Application Data

(63) Continuation of application No. 12/355,480, filed on Jan. 16, 2009, now Pat. No. 8,346,267.

(51) Int. Cl.
*H04W 36/00* (2009.01)
*H04N 21/61* (2011.01)
(Continued)

(52) U.S. Cl.
CPC ........ *H04N 21/6131* (2013.01); *H04L 65/1006* (2013.01); *H04L 65/1016* (2013.01); *H04W 84/045* (2013.01); *H04W 8/005* (2013.01)

(58) Field of Classification Search
CPC ... H04W 84/045; H04W 36/14; H04W 88/06; H04W 24/02; H04W 84/04; H04W 36/18; H04W 84/12; H04W 12/06; H04W 36/00; H04W 36/0011; H04W 40/00; H04W 40/36; H04W 76/023; H04W 12/08; H04W 4/16; H04W 4/24; H04W 12/02; H04W 4/02; H04W 4/12; H04W 48/02; H04W 76/02; H04W 24/00
USPC ............ 370/331, 352; 455/436, 422.1, 414.1, 455/418, 439, 456.1, 552.1, 419, 444, 454
See application file for complete search history.

(56) References Cited

U.S. PATENT DOCUMENTS 8,346,267 B2    1/2013  Chen et al.
2002/0049061 A1  4/2002  Pinola
(Continued)

FOREIGN PATENT DOCUMENTS

WO    WO 2007/000455    1/2007

OTHER PUBLICATIONS

Hyojin Park, FG IPTV-DCO-0059, Focus Group on IPTV, International Telecommunication Union, Telecommunication Standardization Sector, Study period 2005-2008, 2$^{nd}$ FG IPTV Meeting, Busan, Oct. 16-20, 2006, pp. 1-45.

(Continued)

*Primary Examiner* — Fred Casca
(74) *Attorney, Agent, or Firm* — Sterne, Kessler, Goldstein & Fox P.L.L.C.

(57) ABSTRACT

Aspects of a method and system for controlling data distribution via cellular communications with an integrated femtocell and set-top-box (IFSTB) device are provided. In this regard, a cellular enabled communication device may detect when it is within cellular communication range of a femtocell. Upon detection of the femtocell, the cellular enabled communication device may communicate instructions to a content source instructing the content source to deliver multimedia content to the femtocell. In instances that multimedia content is already being delivered to the cellular enabled communication device prior to the detection, the instructions from the cellular enabled communication device may instruct the content source to redirect the multimedia content to the femtocell. In this regard, the multimedia content may be delivered from the content source to the cellular enabled communication device via the femtocell. The femtocell may deliver at least a portion of the multimedia content to other communication devices.

21 Claims, 7 Drawing Sheets

(51) Int. Cl.
*H04W 84/04* (2009.01)
*H04L 29/06* (2006.01)
*H04W 8/00* (2009.01)

(56) References Cited

U.S. PATENT DOCUMENTS

| | | |
|---|---|---|
| 2006/0209795 A1 | 9/2006 | Chow et al. |
| 2007/0070180 A1* | 3/2007 | Rooven .................. 348/14.02 |
| 2007/0121655 A1 | 5/2007 | Jin |
| 2008/0034095 A1 | 2/2008 | Richardson et al. |
| 2008/0116145 A1 | 5/2008 | Johnson et al. |
| 2008/0159232 A1 | 7/2008 | Thalanany et al. |
| 2008/0216145 A1 | 9/2008 | Barton et al. |
| 2008/0244148 A1 | 10/2008 | Nix, Jr. et al. |
| 2008/0305801 A1 | 12/2008 | Burgess et al. |
| 2009/0042536 A1 | 2/2009 | Bernard et al. |
| 2009/0061873 A1 | 3/2009 | Bao et al. |
| 2009/0092081 A1 | 4/2009 | Balasubramanian et al. |
| 2009/0098858 A1 | 4/2009 | Gogic |
| 2009/0129336 A1* | 5/2009 | Osborn .................. 370/331 |
| 2009/0129348 A1* | 5/2009 | Osborn .................. 370/338 |
| 2009/0164547 A1 | 6/2009 | Ch'ng |
| 2009/0279430 A1 | 11/2009 | Huber et al. |
| 2009/0279519 A1 | 11/2009 | Brisebois et al. |
| 2009/0280779 A1 | 11/2009 | Torres et al. |
| 2009/0288144 A1 | 11/2009 | Huber et al. |
| 2009/0292799 A1 | 11/2009 | Eisener et al. |
| 2009/0316649 A1 | 12/2009 | Chen |
| 2010/0146076 A1* | 6/2010 | Adriazola et al. ............ 709/219 |
| 2010/0159895 A1 | 6/2010 | Wallis et al. |
| 2010/0167734 A1 | 7/2010 | Jones et al. |
| 2010/0182991 A1 | 7/2010 | Abraham et al. |
| 2010/0184414 A1 | 7/2010 | Abraham et al. |
| 2010/0184423 A1 | 7/2010 | Kent et al. |
| 2010/0184450 A1 | 7/2010 | Chen et al. |
| 2010/0186027 A1 | 7/2010 | Hou et al. |
| 2010/0210239 A1 | 8/2010 | Karaoguz et al. |
| 2010/0215029 A1 | 8/2010 | Karaoguz et al. |
| 2010/0220642 A1 | 9/2010 | Abraham et al. |
| 2010/0220692 A1 | 9/2010 | Diab et al. |
| 2010/0220731 A1 | 9/2010 | Diab et al. |
| 2010/0222054 A1 | 9/2010 | Abraham et al. |
| 2010/0222069 A1 | 9/2010 | Abraham et al. |
| 2010/0238836 A1 | 9/2010 | Diab et al. |

OTHER PUBLICATIONS

European Search Report corresponding to European Patent Application No. 1000134136-1244, dates Jul. 5, 2010.
Office Action mailed Jul. 20, 2011 in U.S. Appl. No. 12/355,480, inventors Chen et al., filed Jan. 16, 2009.
Office Action mailed Oct. 31, 2011 in U.S. Appl. No. 12/355,480, inventors Chen et al., filed Jan. 16, 2009.

* cited by examiner

METHOD AND SYSTEM FOR CONTROLLING DATA DISTRIBUTION VIA CELLULAR COMMUNICATIONS UTILIZING AN INTEGRATED FEMTOCELL AND SET-TOP-BOX DEVICE

CROSS-REFERENCE TO RELATED APPLICATIONS/INCORPORATION BY REFERENCE

This application is a Continuation Application of U.S. application Ser. No. 12/355,480, filed Jan. 16, 2009, which is hereby incorporated by reference in its entirety.

FIELD OF THE INVENTION

Certain embodiments of the invention relate to communications. More specifically, certain embodiments of the invention relate to a method and system for controlling data distribution via cellular communications utilizing an integrated femtocell and set-top-box (IFSTB) device.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for controlling data distribution via cellular communications utilizing an integrated femtocell and set-top-box (IFSTB) device, substantially as shown in and/or described in connection with at least one of the figures, as set forth more completely in the claims.

These and other advantages, aspects and novel features of the present invention, as well as details of an illustrated

BRIEF DESCRIPTION OF THE DRAWINGS/FIGURES

DETAILED DESCRIPTION OF THE INVENTION

Certain embodiments of the invention may be found in a method and system for controlling data distribution via cellular communications utilizing an integrated femtocell and set-top-box (IFSTB) device. In various embodiments of the invention, a cellular enabled communication device may detect when it is within cellular communication range of a femtocell. Upon the detection of the femtocell, the cellular enabled communication device may communicate instructions to a content source instructing the content source to deliver multimedia content to the femtocell. In various embodiments of the invention, the femtocell may be integrated with a set-top-box. In instances that multimedia content is already being delivered to the cellular enabled communication device prior to the detection, the instructions from the cellular enabled communication device may instruct the content source to redirect the multimedia content to the femtocell. In this regard, the multimedia content may be delivered from the content source to the cellular enabled communication device via the femtocell.

The femtocell may deliver at least a portion of the multimedia content to other communication devices. For example, the femtocell may deliver at least a portion of the content to audio and/or video devices via audio and/or video interfaces. The femtocell may be operable to transcode the multimedia content for transmission to the other communication devices and/or for communication over a cellular channel to the cellular enabled communication device. Permissions, features, and/or functionality of the other communication devices with regard to the delivered multimedia content may be based on a user profile associated with said cellular enabled communication device. The user profile may comprise security information required to access said multimedia content. The user profile may be communicated to the cellular enabled communication device via a cellular communication channel that is out-of-band with regard to the communication channels that are established between the femtocell and the cellular enabled communication device, and/or out-of-band with regard to communication channels between said femtocell and said content source. A user of the cellular enabled communication device may manually interact with the cellular enabled communication device to control the instructions sent to the content source.

Figure 1A:
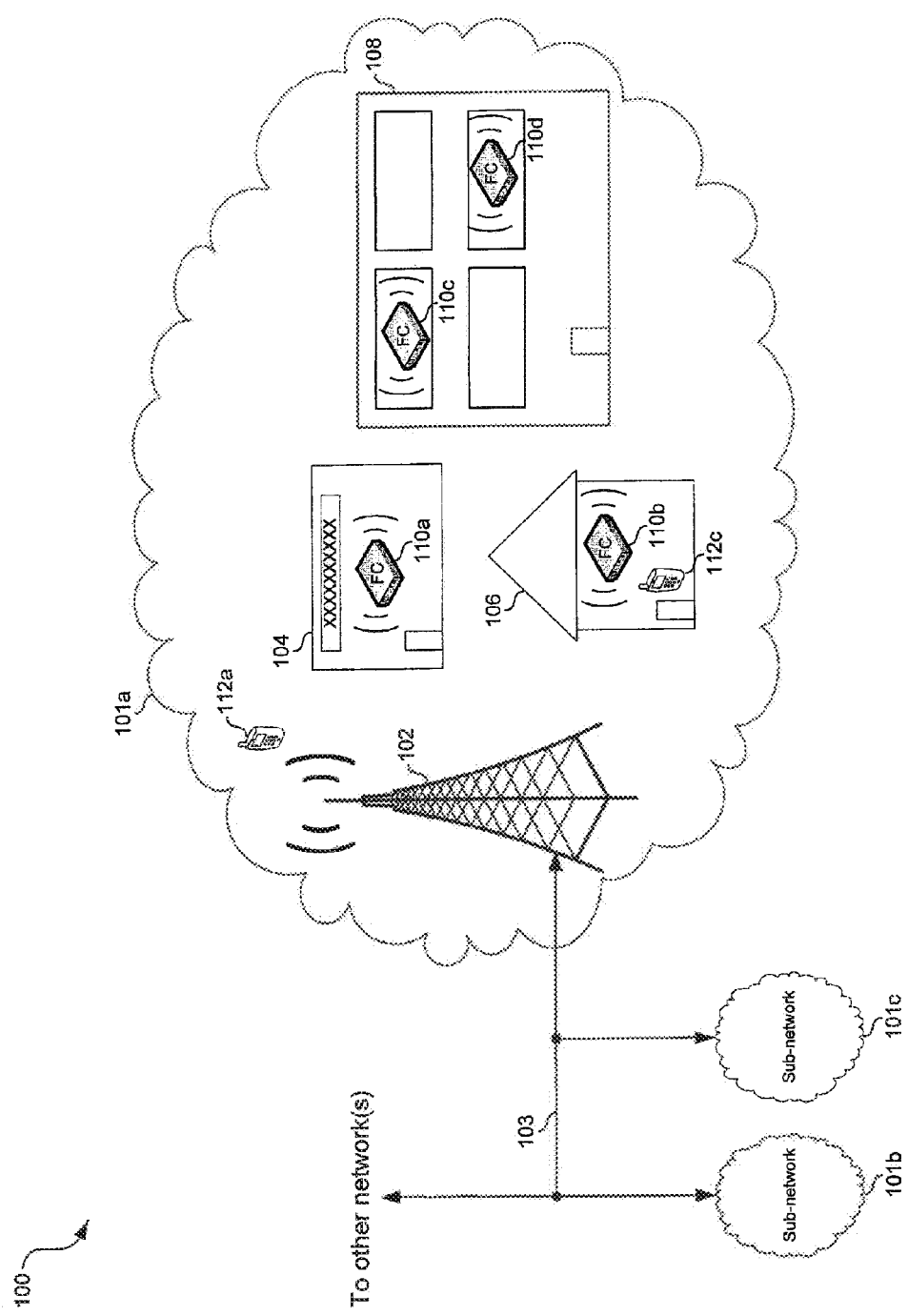
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a base station 102, femtocells 110a-110d, which are collectively referred to herein as femtocells 110, and cellular enabled communication devices 112a and 112c, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise, for example, residential and/or commercial tenants such as apartments, condos, hotels, and/or high rises. One or more of the commercial properties 104, residential properties 106, and/or multi-tenant properties 108 may comprise computing and/or multimedia networks which may comprise an integrated femtocell and set-top-box (IFSTB) device.

The base station 102 may be operable to communicate data wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the subnetwork 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecommunications-2000 (IMT-2000) standard and/or developed by the 3$^{rd}$ generation partnership project (3GPP) and/or the 3$^{rd}$ generation partnership project 2 (3GPP2). Additionally, the femtocells 110 may each comprise suitable logic, circuitry, and/or code that may be operable to communicate over a broadband and/or IP based network. Also, the femtocells 110, or equivalent functionality, may be integrated into a set-top-box or set-top-box functionality may be integrated into a femtocell. Accordingly, services and/or content may be conveyed to cellular enabled communication devices via cellular communications with an integrated femtocell and set-top-box (IFSTB) device.

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players. The cellular enabled communication devices 112 may be enabled to receive, process, and present multimedia content and may additionally be enabled run a web browser or other applications for providing Internet services to a user of the cellular enabled communication device 112.

In operation, the cellular enabled communication devices 112 may gain access to the cellular network 100 and/or to other communication networks via cellular communications with the base station 102 and the femtocells 110. In this regard, in instances that a reliable cellular connection may be established between the base station 102 and a cellular enabled communication device 112, then data may be communicated between the cellular enabled communication device 112 and the base station 102. Alternatively, in instances that a reliable cellular connection may be established between a femtocell 110 and a cellular enabled communication device 112, then data may be communicated between the cellular enabled communication device 112 and the femtocell 110. Accordingly, the femtocells 110 may extend the cellular coverage area in the sub-network 101a. In particular, the femtocells 110 may extend or improve cellular coverage indoors or locations out of range of a base-station.

The femtocell 110 may be integrated in a set-top-box and thus the set-top-box may distribute services and/or content to one or more cellular enabled communication devices 112 and/or one or more other multimedia and/or computing devices (not shown in FIG. 1A). In this regard, the femtocell 110 may be enabled to receive multimedia content from a multimedia source and deliver the content to cellular enabled communication devices and/or other communication devices. In various embodiments of the invention, a cellular enabled communication device may be enabled to detect when it is within cellular communication range of a femtocell and may transmit instructions to a content source to instruct the content source to deliver multimedia content to the femtocell rather than, or in addition to, delivering the content to the cellular communication device.

Figure 1B:
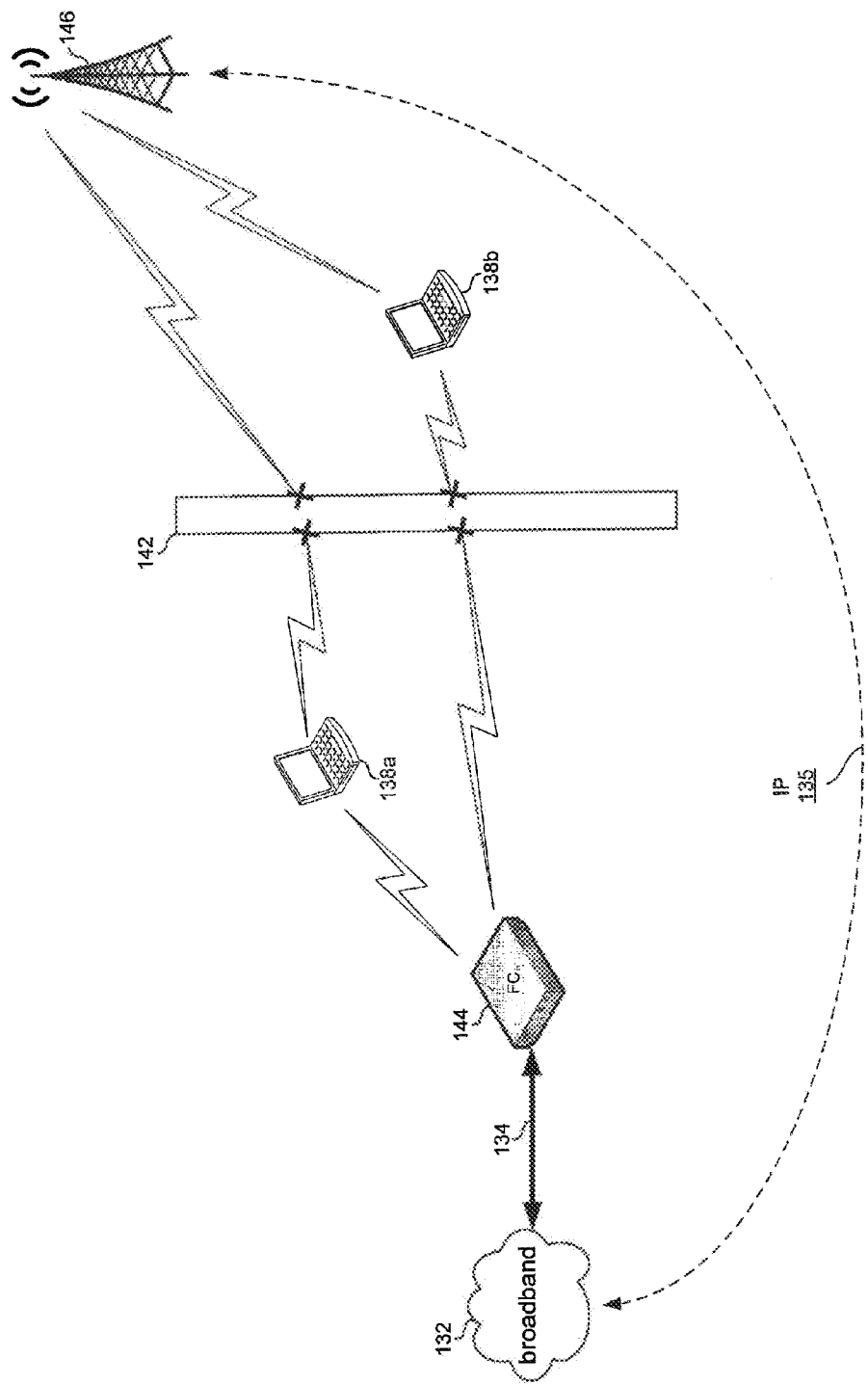
FIG. 1B is a diagram illustrating communication with a cellular network comprising a femtocell, in accordance with an embodiment of the invention.

FIG. 1B is a diagram illustrating communication with a cellular network comprising a femtocell, in accordance with an embodiment of the invention. Referring to FIG. 1B, there is shown a femtocell 144, cellular enabled communication devices 138a and 138b (collectively referred to herein as cellular enabled communication devices 138), communication barrier 142, and base station 146. The femtocell 144 may be communicatively coupled to an broadband and/or IP based network 132 via a broadband connection 134.

The base station 146 may be similar to or the same as the base station 102 described with respect to FIG. 1A. The cellular enabled communication devices 138 may be similar to or the same as the cellular enabled communication devices 112 described with respect to FIG. 1A. The femtocell 144 may be similar to or the same as the femtocells 110 described with respect to FIG. 1A. The femtocell 144, or equivalent functionality, may be integrated with set-top-box functionality into a single device. The integrated femtocell and set-top-box (IFSTB) device may distribute content and/or services to cellular enabled communication devices via cellular communication and may distribute content and/or services via communication over the broadband connection 134 and/or various other interfaces (not shown in FIG. 1B).

The broadband network 132 may comprise, for example, a satellite network, cable network, DVB network, the Internet or other IP based network, or similar local or wide area networks, which are capable of conveying data which may comprise multimedia.

The broadband connection 134 may comprise a broadband connection such as a digital subscriber line (DSL), passive optical network (PON), Ethernet, a T1/E1 line, a cable television infrastructure, a satellite television infrastructure, and/or a satellite broadband Internet connection. The broadband connection 134 may comprise one or more optical, wired, and/or wireless links.

The communications barrier 142 may comprise an obstruction to cellular communications. In some instances, the barrier 142 may comprise a physical barrier such as a building or mountainous terrain. In some instances, the barrier 142 may represent a distance which may be too great for reliable cellular communications. In some instances, the barrier 142 may represent interference or a limitation of channel capacity which may prevent cellular communications. The barrier 142 may prevent cellular communications between the base station 146 and the cellular enabled communication device 138a and may prevent cellular communications between the femtocell 144 and the cellular enabled communication device 138b.

In operation, the cellular enabled communication device 138a and the cellular enabled communication device 138b may communicate via the femtocell 144, the base station 146 and the broadband network 132. For example, the cellular enabled communication device 138a may transmit data to the femtocell 144 utilizing one or more cellular standards. The femtocell 144 may packetize the data into, for example, one or more IP packets and the IP packets may be further encapsulated, encoded, transcoded, modulated, or otherwise processed. The IP packets may then be routed via the IP network 132 to the base station 146. In some instances, the base station 146 may utilize IP backloading and the IP packets may be conveyed to the base station 146. In other instances, the IP packets may be transcoded via one or more network elements (not shown) to a format supported by the base station 146. The data may then be extracted from the IP packets, transcoded to a format suitable for cellular transmission, and subsequently transmitted to the cellular enabled communication device 138b. In this manner, the femtocell 144 may enable communication with the cellular enabled communication device 138a even in instances that the cellular enabled communication device 138a is unable to establish reliable cellular communications with a base station.

Even though the cellular enabled communication device 138a may be unable to communicate with the base station 146, multimedia content may be delivered to the cellular enabled communication device 138a via the femtocell 144. In this regard, the femtocell 144 may be enabled to receive multimedia content from a multimedia source and deliver the content to the cellular enabled communication device 138a and/or other communication devices. In various embodiments of the invention, the cellular enabled communication device 138a may be enabled to detect when it is within cellular communication range of the femtocell 144 and may transmit instructions to a content source (not shown in FIG. 1B) to instruct the content source to deliver multimedia content to the femtocell 144 rather than, or in addition to, delivering the content to the cellular enabled communication device via the base station 146.

Although, FIG. 1B describes communication between a pair of cellular enabled communication devices via a single femtocell and a base station, communication with other equipment via one or more femtocells and a broadband network may be similar to the communication described with respect to FIG. 1B. In this regard, devices which may communicate via one or more femtocells may comprise cellular enabled communication devices in other sub-networks, cellular enabled communication devices in different cellular networks, conventional "landline" phones coupled to a PSTN, IP phones, and computing devices such as PCs and fileservers coupled to an IP network. Additionally, an IFSTB may communicate with one or more multimedia devices via one or more audio, video, and/or data interfaces.

Figure 1C:
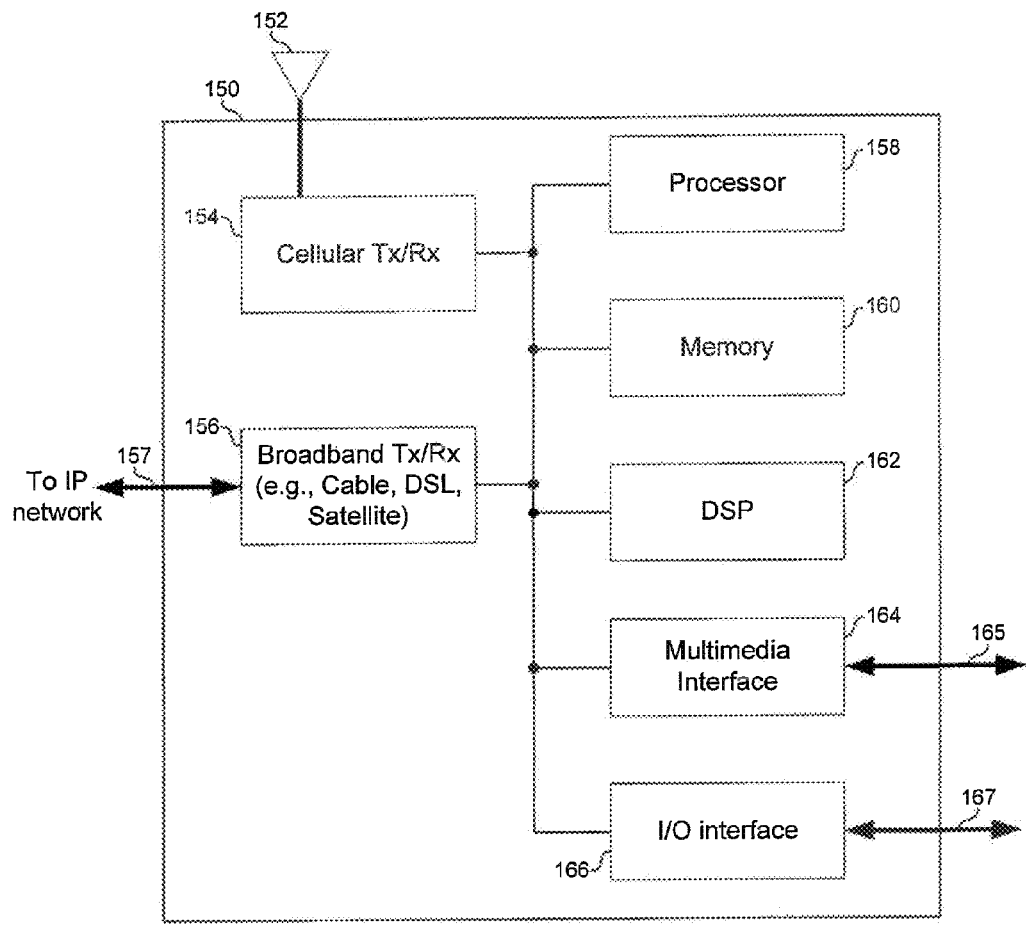
FIG. 1C is a diagram illustrating an exemplary block diagram of an integrated femtocell and set-top-box (IFSTB) device, in accordance with an embodiment of the invention.

FIG. 1C is a diagram illustrating an exemplary block diagram of an integrated femtocell and set-top-box (IFSTB) device, in accordance with an embodiment of the invention. Referring to FIG. 1C the IFSTB 150 may comprise an antenna 152, a cellular transmitter and/or receiver (Tx/Rx) 154, a broadband transmitter and/or receiver (Tx/Rx) 156, a processor 158, a memory 160, a digital signal processor (DSP) 162, an audio and/or video multimedia interface 164 and an input and/or output (I/O) interface 166.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. Exemplary cellular standards supported by the IFSTB 150 may be specified in the International Mobile Telecommunications-2000 (IMT-2000) standard and/or developed by the $3^{rd}$ generation partnership project (3GPP) and/or the $3^{rd}$ generation partnership project 2 (3GPP2).

The broadband Tx/Rx 156 may comprise suitable logic, circuitry, and/or code that may be operable to transmit data in adherence to one or more broadband standard. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. The broadband Tx/Rx 156 may transmit and/or receive data over the broadband connection 157 which may comprise, for example, a T1/E1 line, optical fiber (e.g., xPON), DSL, cable television infrastructure, satellite broadband internet connection, satellite television infrastructure, and/or Ethernet.

The processor 158 may comprise suitable logic, circuitry, and/or code that may enable processing data and/or controlling operations of the IFSTB 150. In this regard, the processor 158 may be enabled to provide control signals to the various other blocks comprising the IFSTB 150. The processor 158 may also control transfers of data between various portions of the IFSTB 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160.

The memory 160 may comprise suitable logic, circuitry, and/or code that may enable storage or programming of information that includes parameters and/or code that may effectuate the operation of the IFSTB 150. The parameters may comprise configuration data and the code may comprise operational code such as software and/or firmware, but the information need not be limited in this regard. Moreover, the parameters may include adaptive filter and/or block coefficients.

The DSP 162 may comprise suitable logic, circuitry, and/or code operable to perform computationally intensive processing of data. In various embodiments of the invention, the DSP 162 may encode, decode, transcode, modulate, demodulate, encrypt, decrypt, scramble, descramble, and/or otherwise process data. In various embodiments of the invention, the DSP 162 may be enabled adjust a modulation scheme, error coding scheme, and/or data rates of transmitted cellular signals data.

The multimedia interface 164 may comprise suitable logic, circuitry, and/or code that may be operable to communicate multimedia content to one or more devices for presentation to a user. In this regard, multimedia content may be extracted from data received via one or more of the cellular Tx/Rx 154, the broadband Tx/Rx 156, and/or the I/O interface 166. For example, the multimedia interface 164 may output analog and/or digital multimedia signals such as analog audio, composite video, analog RGB video, S-Video, component video, DVI, HDMI, and/or DisplayPort. In this regard, the multimedia interface 164 may be operable to up-convert, filter, modulate, and/or amplify multimedia signals. Accordingly, the multimedia connection(s) 165 may comprise one or more multimedia cables suitable for conveying one or more of the multimedia standards supported by the multimedia interface 164.

The I/O interface 166 may comprise suitable logic, circuitry, and/or code that may be operable to exchange information in accordance with one or more communication standards. Exemplary communication standards supported by the I/O interface 166 may comprise USB, IEEE 1394, Wi-Fi, Wi-Max, infrared (IR), and/or Bluetooth. Accordingly, the I/O connection(s) 167 may comprise one or more optical, wired and/or wireless links suitable for conveying one or more of the communication standards supported by the I/O interface 166.

In operation, the IFSTB 150 may be enabled to transmit and/or receive data via cellular communications, transmit and/or receive data over a broadband connection, transmit and/or receive data via the multimedia interface 164, transmit and/or receive data via the I/O interface 166, and transcode or otherwise process data for conveyance between two or more of the cellular Tx/Rx 154, the broadband Tx/Rx 156, the multimedia interface 164, and the I/O interface 166. For example, the IFSTB 150 may transcode between signals formatted for transmission over an audio/video interface such as HDMI, DisplayPort, DVI, or raw audio/video; signals formatted for transmission over an broadband network such as an Ethernet network or a T1 line; and signals transmitted for cellular transmission such as IS-95, CDMA2000, GSM, UMTS, TD-SCDMA. In various embodiments of the invention, data transmitted, received, generated, and/or otherwise processed by the IFSTB 150 may comprise audio and/or video content. In this regard, the IFSTB 150 may be enabled to receive multimedia content from a multimedia source, via the broadband Tx/Rx 156 and deliver the content to cellular enabled communication devices via the cellular Tx/Rx 154 and/or other communication devices via the multimedia interface 164 and/or the I/O interface 166. Additionally, data received via the cellular Tx/Rx 154, the broadband Tx/Rx 156, the multimedia interface 164, and/or the I/O interface 166 may comprise control data which may be utilized to control operations and/or functionality of the femtocell 150. In this regard, the IFSTB may be controlled remotely from, for example, a cellular enabled communication device or a PC.

Figure 2A:
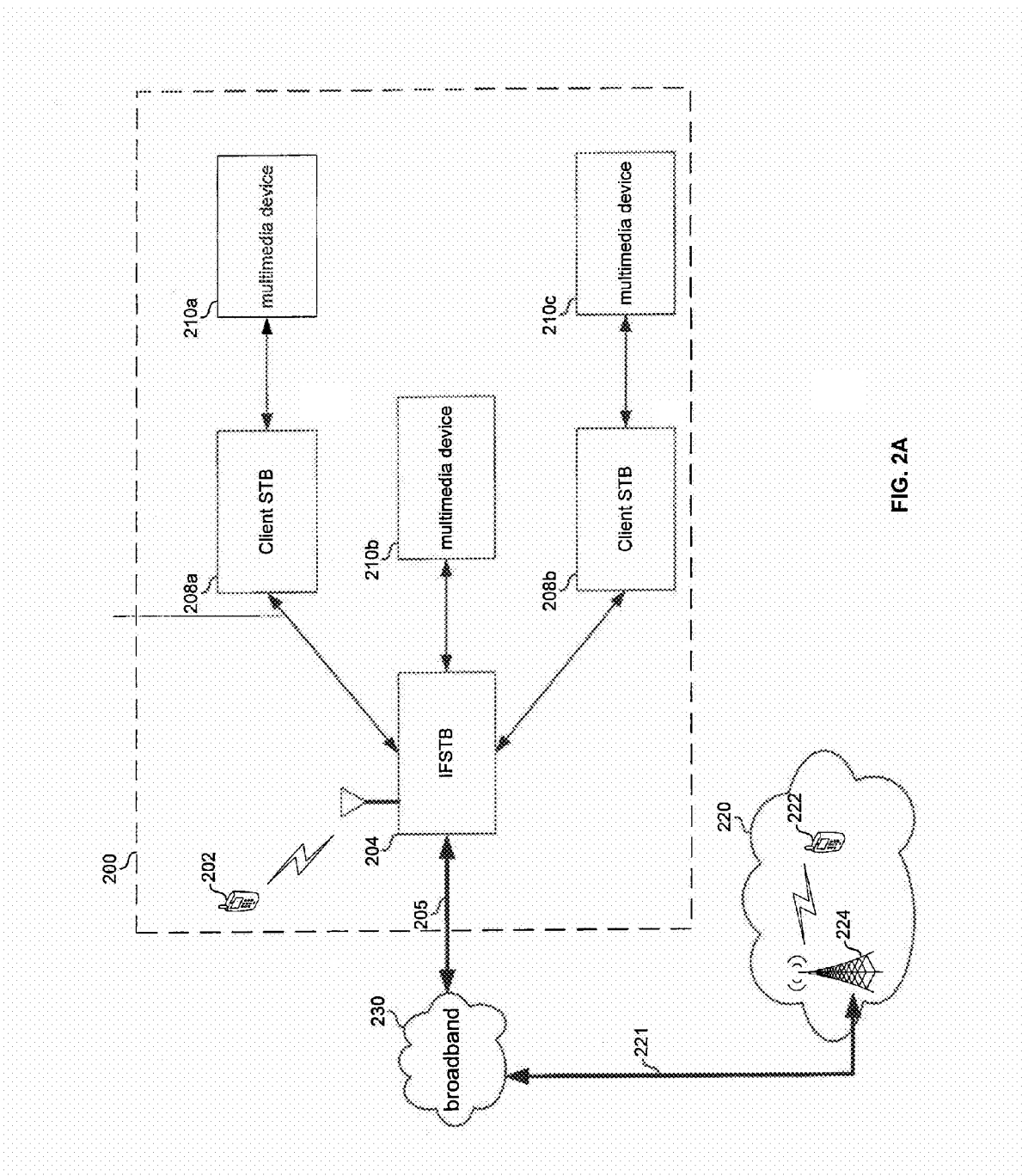
FIG. 2A is a diagram of a multimedia network comprising an integrated femtocell and set-top-box (IFSTB) device, in accordance with an embodiment of the invention.

FIG. 2A is a diagram of a multimedia network comprising an integrated femtocell and set-top-box (IFSTB) device, in accordance with an embodiment of the invention. Referring to FIG. 2A, the multimedia network 200 may comprise a cellular enabled communication device 202, a IFSTB 204, client STBs 208*a* and 208*b*, which are collectively referred to herein as clients STBs 208, and multimedia devices 210*a*, 210*b*, and 210*c*, which are collectively referred to herein as multimedia devices 210. The IFSTB 204 may be communicatively coupled, via broadband connection 205, to a broadband network 230, which may in turn be communicatively coupled, via backhaul connection 221, to a wide area cellular network 220. In various embodiments of the invention, the broadband network 230 may enable Internet access. The broadband connection 205 may provide a connection to a multimedia infrastructure such as a cable or satellite television network.

The wide area cellular network 220 may be similar to or the same as the cellular network 100 described with respect to FIG. 1A. The broadband network 230 may be similar to or the same as the broadband network 132 described with respect to FIG. 1B.

The cellular enabled communication device 202 may be similar to or the same as the cellular enabled communication devices 112 described with respect to FIG. 1A. In various embodiments of the invention, the cellular enabled communication device 202 may store and/or be associated with a user profile for the multimedia network 200. The user profile may comprise information such as active subscriptions, parental settings, and/or personal preferences. Also, the user profile may comprise security information such as certificates, passwords, and/or encryption keys. In this regard, permissions, features, and/or functionality of the cellular enabled communication device 202 and/or one or more other communication devices 202 may be based on a user profile and the security information associated with the user profile may enable viewing and/or otherwise accessing multimedia content. Thus, the user profile may be delivered to and/or configured on the cellular enabled communication device 202 via cellular communications with, for example, a base station such as the base station 224.

In an exemplary embodiment of the invention, an electronic programming guide (EPG) may be customized and delivered to a cellular enabled communication device based on a user profile associated with that cellular enabled communication device. For example, channels, stations, and/or content in the EPG communicated to a cellular enabled communication device may be customized to the capabilities and/or preferences of that device. Additionally and/or alternatively, favorite channels, stations, and/or content associated with a user profile may be communicated by default and/or before non-favorite channels, stations, and/or content.

The backhaul connection 221 may convey data between the wide area cellular network 220 and the broadband network 230. In this regard, the backhaul connection 221 may comprise one or more wireline and/or wireless backhaul links which communicatively couple the base station 224 to the broadband network 230.

The broadband connection 205 may comprise one or more high bandwidth connections that may be enabled to convey data. Exemplary broadband connections may comprise an Ethernet connection, a digital subscriber line (DSL), a T1/E1 line, a cable television infrastructure, a satellite television infrastructure, and/or a satellite broadband Internet connection. The broadband connection 205 may comprise one or more optical, wired and/or wireless links.

The integrated femtocell and set-top-box (IFSTB) device 204 may comprise suitable logic, circuitry, and/or code that may be operable to receive data, transcode and/or otherwise process the received data, and transmit the data. The IFSTB 204 may be operable to transmit and/or receive data via cellular communication. The IFSTB 204 may be operable to transmit and/or receive data via the broadband connection 205. In some embodiments of the invention, IFSTB 204 may be operable to output multimedia content, extracted from received data, to one or more multimedia devices 210. In some embodiments of the invention, IFSTB 204 may be operable to forward received data to one or more client STBs 208.

In some embodiments of the invention, the permissions, features, and/or functionality of the IFSTB 204, and thus services (e.g., Internet access) and/or multimedia content available to the network 200, may be configurable and may be determined based on one or more user profiles. Accordingly, a first set of services and/or multimedia content may be available to the network 200 for a first user profile and a second set of services and/or multimedia content may be available for a second user profile. The first user profile may be similar to or different from the second user profile. In some embodiments of the invention, the profile may be persistent and may only need to be periodically updated via cellular communications with a cellular enabled communication device. In some embodiments of the invention, the user profile may only be valid while an associated or particular cellular enabled communication device is within cellular communication range of the IFSTB 204.

The client STBs 208 may each comprise suitable logic, circuitry, and/or code operable to receive data, extract multimedia content from the received data, process the multimedia content, and output the multimedia content to one or more multimedia devices 210. In some embodiments of the invention, the permissions, features, and/or functionality of the client STBs 208 may be configurable. In this manner, multimedia content that may be extracted, processed, and/or presented by the client STBs 208 may be determined based on one or more user profiles. In some embodiments of the invention, the client STBs 208 may be physically the same as the IFSTB 204 but may be configured differently than the IFSTB 204 based, at least in part, on one or more user profiles. In some embodiments of the invention, one or more of the client STBs may comprise or may be communicatively coupled to a cellular enabled communication device. For example, the may be coupled via a USB or IEEE 1394 connection to a cellular phone or broadband access card.

The multimedia devices 210 may comprise, for example, televisions, displays, stereo systems, and/or recording and/or playback devices. The multimedia devices 210 may be enabled to receive audio and/or video content and present the content to a user.

In operation, the cellular enabled communication device 202 may enter cellular communication range of the IFSTB 204. Subsequently, the cellular enabled communication device 202 may communicate its user profile to the IFSTB 204 via cellular communications. In this manner, the user profile may be delivered to and/or verified by the network 200 via a communication channel that is out-of-band with the broadband connection 205. Accordingly, security of the content and/or services may be improved over conventional multimedia networks since the user profile may be delivered or handled separate from the content and/or services that the user profile controls. Upon receipt and/or verification of the user profile by the IFSTB 204, the IFSTB 204 and/or the client STBs 208 may be configured based on the user profile.

Subsequent to configuration of the network 200, the IFSTB 204 may begin receiving data via the broadband connection 205. In this regard, upon entering cellular communication range with the IFSTB 204, the cellular enabled communication device 202 may send one or more instructions to a content source, directing the content source to send data to the IFSTB 204 instead of, or in addition to, sending the data to the cellular enabled communication device 202. The received data may be transcoded or otherwise processed, and may be forwarded to the cellular enabled communication device 202, to the client STB 208a, and/or to the client STB 208b.

Furthermore, a user of the cellular enabled communication device 202 may control which data is routed to which component of the multimedia network 200. For example, the user may, via the cellular enabled communication device 202, provide one or more commands to send television content to the client STB 208b for recording on the multimedia device 210c, send radio data to the client STB 208a for listening on the multimedia device 210a, send an "on-demand" program to the multimedia device 210b for viewing by the user, and/or send Internet data to the cellular enabled communication device 202.

In some embodiments of the invention, the network 200 may be controlled remotely via data received over the broadband network 230. For example, the cellular enabled communication device 222 may request an operation be performed by the network 200 by sending data to the IFSTB 204 via the base station 224, the backhaul connection 221, the broadband network 230, and the broadband connection 205. In some embodiments of the invention, the operation requested by the cellular enabled communication device 222 may be performed because the cellular enabled communication device 222 may have previously been in cellular communication range of the IFSTB 204 and a user profile associated with the cellular enabled communication device 222 may still be valid. In other embodiments of the invention, the operations requested remotely by the cellular enabled communication device 222 may be performed conditionally. For example, the cellular enabled communication device may remotely send a command for the network 200 to record a television show. Accordingly, the IFSTB 204 or one of the client STBs 208 may record the show, but the show may not be viewable until the cellular enabled communication device 222 comes within range of the IFSTB 204 and the pertinent profile information may be validated.

Figure 2B:
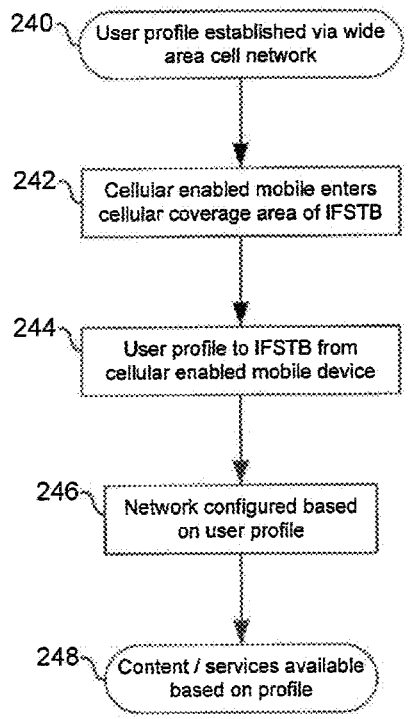
FIG. 2B is a flow chart illustrating exemplary steps for controlling distribution of data in a network via an integrated femtocell and set-top-box (IFSTB) device.

FIG. 2B is a flow chart illustrating exemplary steps for controlling distribution of data in a network via an integrated femtocell and set-top-box (IFSTB) device. Referring to FIG. 2B, the exemplary steps may begin with step 240 when a user profile associated with a cellular enabled communication device may be configured based on, for example, subscriptions, parental settings, and/or personal preferences of a user of the cellular enabled communication device. In this regard, the user profile may be configured via cellular communications with a wide area cellular network. Thus, the user profile, including any related security information, may be configured out-of-band with any local area networks to which the user profile may apply. Subsequent to step 240, the exemplary steps may advance to step 242.

In step 242 a cellular enabled communication device may enter a cellular coverage area of an IFSTB. In this regard, the IFSTB may be part of a network for which services and/or content available may depend on the user profile configured in step 240. Subsequent to step 242, the exemplary steps may advance to step 244.

In step 244, the user profile configured in step 242 may be communicated to and/or verified with the IFSTB utilizing cellular communications. Subsequent to step 244, the exemplary steps may advance to step 246.

In step 246, the IFSTB and/or other devices communicatively coupled to the IFSTB may be configured based on the user profile. Subsequent to step 246, the exemplary steps may advance to step 248.

In step 248, the network, the IFSTB acting as a service and/or multimedia gateway and may begin distributing data based on the user profile. For example, certain services and/or content may be blocked from one or more portions of the network based on, for example, parental settings, user preferences, user subscriptions, and/or user location.

Figure 3A:
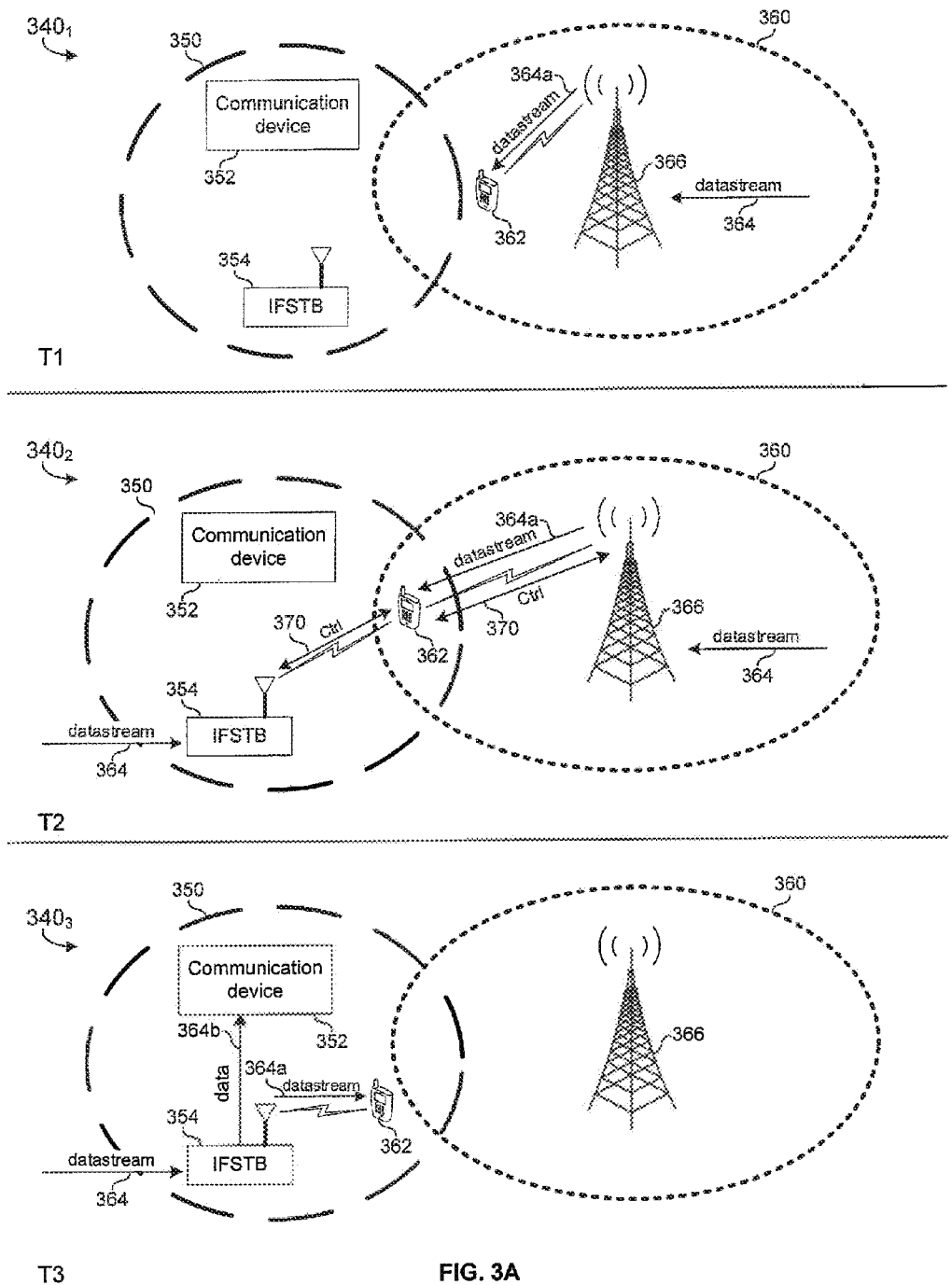
FIG. 3A is a diagram illustrating data redirection based on communication between a cellular enabled communication device and an integrated femtocell and set-top-box (IFSTB) device, in accordance with an embodiment of the invention.

FIG. 3A is a diagram illustrating re-direction of multimedia based on communication between a cellular enabled communication device and a femtocell, in accordance with an embodiment of the invention. Referring to FIG. 3A there is shown a system 340 at time instants T1, T2, and T3 (referenced as $340_1$, $340_2$, and $340_3$, respectively). The system 340 comprises an IFSTB 354 with a cellular coverage area 350, communication device 352, a cellular enabled communication device 362, and a base station 366 with a coverage area 360.

The cellular enabled communication device 362 may be similar to or the same as the cellular enabled communication devices 112 described with respect to FIG. 1A. The base station 366 may be similar to or the same as the base station 102 described with respect to FIG. 1A. The IFSTB 354 may be similar to or the same as the IFSTB 204 described with respect to FIG. 2A. The IFSTB 354 may be part of a multimedia network which may additionally comprise the communication device 352.

In various embodiments of the invention, the communication device 352 may be similar to or the same as the client STBs 208 described with respect to FIG. 2A. In various embodiments of the invention, the communication device 352 may be similar to or the same as the multimedia devices 210 described with respect to FIG. 2A. In some embodiments of the invention, the communication device 352 may be another cellular enabled communication device such as a laptop, personal media player, or personal data assistant. In various embodiments of the invention, the communication device 352 may be a computing device such as a PC or file server.

At time instant T1, the cellular enabled communication device 362 may be within the cellular coverage area 360 and may be receiving a datastream 364a via cellular communications with the base station 366. For example, the datastream 364 may comprise multimedia content and/or Internet data. The datastream 364a may be a transcoded or otherwise processed version of the datastream 364 which the base station 366 may be receiving via, for example, a backhaul link.

At time T2, the cellular enabled communication device 362 may enter the cellular coverage area 350 of the IFSTB 354 and may still be in the cellular coverage area 360 of the base station 366. For example, the cellular enabled communication device 362 may be just outside a home or office of its user. Accordingly, the cellular enabled communication device 362 may continue to receive the datastream 364a from the base station 366 but may additionally exchange control information 370 with the base station 366 and/or the IFSTB 354 to coordinate a handoff of the cellular enabled communication device 362 from the base station 366 to the IFSTB 354. The user of cellular enabled communication device 362 may desire to continue receiving the datastream 364a upon leaving the coverage area 360 and thus the control information 370 may coordinate redirection and/or mirroring of the datastream 364 to the IFSTB 354.

Thus, at time T3, the IFSTB 354 may begin receiving the datastream 364 and may transcode or otherwise process the datastream 364 to generate a derivative datastream 364a which may be in a format suitable for the cellular enabled communication device 362. For example, the transcoding may comprise adjusting the resolution, frame rate, compression, and/or color depth of video signals. Similarly, the transcoding may comprise, for example, adjusting the sample rate and bit depth of audio signals. The datastream 364a may then be transmitted to the cellular enabled communication device 362. In this regard, from the perspective of the cellular enabled communication device 362, the datastream 364a may continue uninterrupted before, during, and after handoff from the base station 366 to the IFSTB 354. Additionally and/or alternatively, the datastream 364 may be transcoded and/or otherwise processed to generate the derivative datastream 364b which may be in a format suitable for transmission via, for example, an HDMI interface. In this manner, the datastream 364b may be conveyed to the communication device 352.

In some embodiments of the invention, a user profile associated with the cellular enabled communication device 362 may determine where a datastream may be directed and, correspondingly, how the datastream may be transcoded or otherwise processed. In some embodiments of the invention, the cellular enabled communication device 362 may present a visual and/or aural cue to its user upon detecting it is within the cellular coverage area 350. In this manner, user input may determine where a datastream may be directed and, correspondingly, how the datastream may be transcoded or otherwise processed.

Figure 3B:
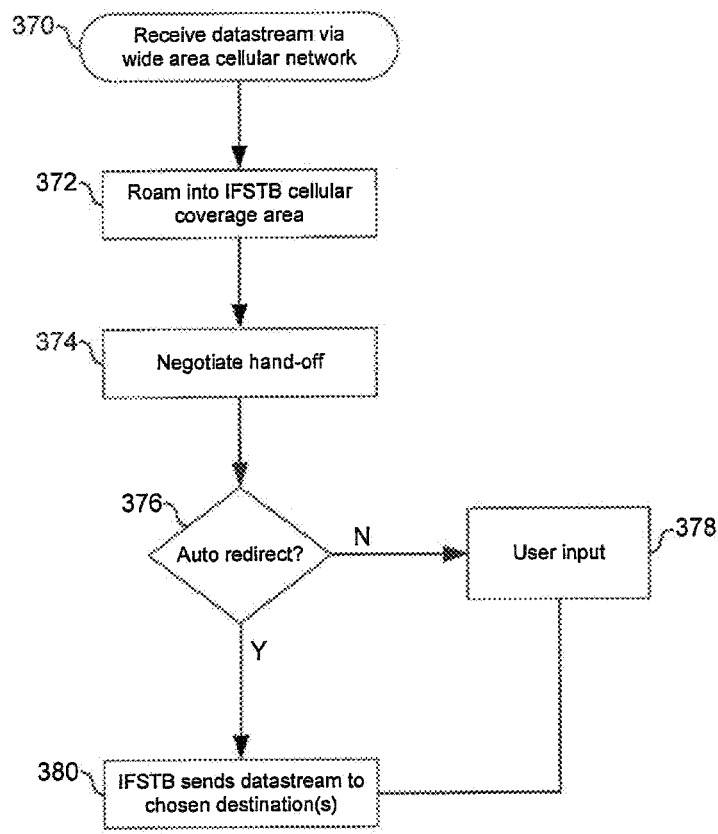
FIG. 3B is a flow chart illustrating exemplary steps for redirecting data based on communication between a cellular enabled communication device and an integrated femtocell and set-top-box (IFSTB) device, in accordance with an embodiment of the invention.

FIG. 3B is a flow chart illustrating exemplary steps for redirecting data based on communication between a cellular enabled communication device and an integrated femtocell and set-top-box (IFSTB) device, in accordance with an embodiment of the invention. Referring to FIG. 3B, the exemplary steps may begin with step 370 when a cellular enabled mobile device may be receiving a datastream from a wide area cellular network. Subsequent to step 370, the exemplary steps may advance to step 372.

In step 372, the cellular enabled communication device may roam into the cellular coverage area of an IFSTB. For example, a user of the cellular enabled communication device may come home where an IFSTB communicatively coupled to, for example, one or more multimedia devices and/or computing devices. Subsequent to step 372, the exemplary steps may advance to step 374.

In step 374, the cellular enabled communication device may exchange control information with the wide area cellular network and with the IFSTB to coordinate a handoff from the wide area cellular network to the IFSTB. Subsequent to step 374, the exemplary steps may advance to step 376.

In step 376, in some instances the user profile may be such that the cellular enabled communication device may poll its user for a desired destination of the datastream. In such instances, the exemplary steps may advance to step 378.

In step 378, the user may provide input to control the destination of the datastream. In an exemplary embodiment of the invention, the cellular enabled communication device may cue its user to select whether the user wants to continue receiving the datastream, and if so, to select what delivery method should be used. For example, the user may have a choice to continue receiving the datastream, via cellular communications with the IFSTB, on the cellular enabled communication device or to receive the datastream on a television via, for example, an HDMI interface of the IFSTB. Subsequent to step 378, the exemplary steps may advance to step 380.

In step 380, the IFSTB may communicate the datastream to the destination(s) determined in steps 376 or 378. In this regard, the IFSTB may transcode or otherwise process the datastream and may output the datastream via one or more of a variety of interfaces such as cellular, HDMI, DisplayPort, USB, IEEE 1394, and/or analog audio and/or video interfaces.

Returning to step 376, in some instances the user profile may be such that the destination of the datastream may automatically change when the cellular enabled communication device enters the cellular coverage area of the IFSTB. In such instances, the exemplary steps may advance to the previously described step 380.

Exemplary aspects of a method and system for controlling data distribution via cellular communications with an integrated femtocell and set-top-box (IFSTB) device. In an exemplary embodiment of the invention, a cellular enabled communication device 362 (FIG. 3A) may detect when it is within cellular communication range 350 (FIG. 3A) of a femtocell 354 (FIG. 3A) and, upon said detection, communicate instructions to a content source instructing the content source to deliver multimedia content 364 (FIG. 3A) to the femtocell 354. The femtocell 354 may be integrated with a set-top-box into a single device. In instances that multimedia content 364 is already being delivered to the cellular enabled communication device 362 prior to the detection, the instructions from the cellular enabled communication device 362 may instruct the content source to redirect the multimedia content 364 to the femtocell 354. In this regard, the multimedia content may be delivered from the content source to the cellular enabled communication device 362 via the femtocell 354.

The femtocell 354 may deliver at least a portion of the multimedia content 364 to other communication devices. For example, the femtocell 354 may deliver at least a portion of the content 364 to audio and/or video devices (e.g., 208 and 210 of FIG. 2A) via audio and/or video interfaces (e.g., 164 of FIG. 1C). The femtocell 354 may be operable to transcode the multimedia content 364 for transmission to other communication devices and/or for communication over a cellular channel to the cellular enabled communication device 362. Permissions, features, and/or functionality of the other communication devices with regard to the delivered multimedia content 364 may be based on a user profile associated with said cellular enabled communication device 362. The user profile may comprise security information required to access said multimedia content 364. The user profile may be communicated to the cellular enabled communication device 362 via a cellular communication channel that is out-of-band with regard to the communication channels that are established between the femtocell 354 and the cellular enabled communication device 362, and/or out-of-band with regard to the communication channels between the femtocell 354 and said content source. A user of the cellular enabled communication device 362 may manually interact with the cellular enabled communication device 362 to control the instructions sent to the content source.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for controlling data distribution via cellular communications with an integrated femtocell and set-top-box (IFSTB) device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A networking method, comprising:
   receiving a data stream in a cellular enabled communication device;
   detecting when the cellular enabled communication device is within cellular communication range of a femtocell integrated with a set-top-box device;
   communicating a user profile by the cellular enabled communication device to the femtocell via a cellular communication channel responsive to detecting that the cellular enabled communication device is within range of the femtocell;
   communicating from the cellular enabled communication device an instruction to a content source to redirect delivery of the data stream to at least one or more other communication devices coupled to the femtocell via the set-top-box; and
   determining, based on the user profile, content of the data stream available to the one or more other communication devices.

2. The method according to claim 1, wherein, prior to the detecting, the cellular enabled communication device receives the data stream from the content source via a cellular communication.

3. The method according to claim 1, further comprising:
   transcoding the data stream in the femtocell integrated with the set-top box from a first format to a second format suitable for transmission to the cellular enabled communication device or the one or more other communication devices.

4. The method according to claim 3, wherein permissions, features, or functionality of the cellular enabled communication device or the another communication device are based on the user profile associated with the cellular enabled communication device.

5. The method according to claim 4, wherein the user profile comprises security information required to access the data stream.

6. The method according to claim 1, wherein the cellular enabled communication device is configured to receive commands from a user to control the instruction.

7. The method according to claim 1, further comprising:
   transcoding the data stream in the femtocell from a first format to a second format suitable for transmission to the cellular enabled communication device, utilizing a cellular communication protocol.

8. The method according to claim 1, wherein the cellular communication channel is out-of-band with regard to the communication channels that are established between the femtocell and the broadband network.

9. The method according to claim 1, wherein the femtocell is configured based on the user profile.

10. The method according to claim 1, further comprising redirecting delivery of the data stream from the content source to the cellular enabled communication device via the femtocell.

11. The method according to claim 1, delivering the content to the one or more other communication devices from the set-top-box device integrated with the femtocell.

12. A system for networking comprising:
   a circuit for use in a cellular enabled communication device, configured to:
   detect when the cellular enabled communication device is within cellular communication range of a femtocell while the cellular enabled communication device is receiving a data stream;
   communicate a user profile to the femtocell via a cellular communication channel responsive to detecting that the cellular enabled communication device is within range of the femtocell; and
   communicate from the cellular enabled communication device an instruction to a content source to redirect delivery of the data stream to at least one or more other communication devices via the femtocell; and a set-top-box device integrated with the femtocell, and coupled to the one or more other communication devices, the set-top-box configured to:
receive the user profile from the cellular enabled communication device via the cellular communication channel;
determine the content of the data stream available to the one or more other communication devices based on the user profile; and
deliver the content to the one or more other communication devices.

13. The system according to claim 12, wherein the circuit is further configured to, prior to the detection, receive the data stream from the content source via a cellular communication.

14. The system according to claim 12, wherein the set-top-box integrated with the femtocell is further configured to transcode the data stream from a first format to a second format suitable for transmission to the cellular enabled communication device or the one or more other communication devices.

15. The system according to claim 14, wherein permissions, features, or functionality of the cellular enabled communication device or the one or more other communication devices are based on the user profile associated with the cellular enabled communication device.

16. The system according to claim 15, wherein the user profile comprises security information required to access the data stream.

17. The system according to claim 12, wherein the cellular enabled communication device is configured to receive commands from a user to control the instruction.

18. The system according to claim 12, wherein the set-top-box integrated with the femtocell is further configured to transcode the data stream from a first format to a second format suitable for transmission to the cellular enabled communication device, utilizing a cellular communication protocol.

19. The system according to claim 12, wherein the cellular communication channel is further configured to be out-of-band with regard to the communication channels that are established between a femtocell and a broadband network.

20. The system according to claim 12, wherein the femtocell is configured based on the user profile.

21. The system according to claim 12, wherein the femtocell is configured to redirect delivery of the data stream from the content source to the cellular enabled communication device.

* * * * *